(12) United States Patent
Swanson

(10) Patent No.: US 6,925,747 B1
(45) Date of Patent: Aug. 9, 2005

(54) FISHING LURE

(76) Inventor: Jon A. Swanson, 680 Bently St., Oviedo, FL (US) 32765

( * ) Notice: Subject to any disclaimer, the term of this patent is extended or adjusted under 35 U.S.C. 154(b) by 0 days.

(21) Appl. No.: 10/684,456

(22) Filed: Oct. 14, 2003

(51) Int. Cl.[7] .............................................. A01K 85/00
(52) U.S. Cl. ......................... 43/42.02; 43/17.1; 43/26.2
(58) Field of Search ............................... 43/17.1, 26.2, 43/42.02

(56) References Cited

U.S. PATENT DOCUMENTS

| 941,911 | A | * | 11/1909 | Burthe ....................... 43/42.02 |
| 1,857,312 | A | * | 5/1932 | Kuehn ....................... 43/42.02 |
| 1,888,221 | A | * | 11/1932 | Coffin ....................... 43/42.02 |
| 1,906,791 | A | * | 5/1933 | Grossmann ................. 43/26.2 |
| 2,430,111 | A | * | 11/1947 | Dory ......................... 43/42.02 |
| 2,519,236 | A | * | 8/1950 | Lyman ...................... 43/42.02 |
| D172,024 | S | | 4/1954 | Hogreff |
| 2,867,933 | A | * | 1/1959 | Stookey ..................... 43/42.02 |
| 4,888,904 | A | | 12/1989 | Douglas, Jr. |
| 5,105,573 | A | | 4/1992 | Mays |
| 5,203,103 | A | * | 4/1993 | Hawley ..................... 43/17.1 |
| 5,500,635 | A | | 3/1996 | Mott |
| 5,694,714 | A | | 12/1997 | Basso et al. |
| 6,058,644 | A | | 5/2000 | Irwin et al. |

* cited by examiner

Primary Examiner—Kurt Rowan

(57) ABSTRACT

A fishing lure includes a body having a loop and a hook attached thereto. Each of a plurality of legs has first end and a second end. Each of a plurality of spindles is pivotally mounted in a peripheral wall of the body. The spindles each have an outer end attached to one of the first ends of the legs. Each of a plurality of wires is mounted in the body and each is attached to one of the spindles. The wires comprise a shape memory alloy and contract in length generally between 1% and 10% when subjected to an electric current to rotate the spindles a first direction. A processor is electrically coupled attached to each of the wires and is adapted for sending pulses of electric current in a series to the wires.

9 Claims, 3 Drawing Sheets

FISHING LURE

BACKGROUND OF THE INVENTION

1. Field of the Invention

The present invention relates to fishing lure devices and more particularly pertains to a new fishing lure device for attracting a fish by simulating a struggling insect.

2. Description of the Prior Art

The use of fishing lure devices is known in the prior art. While these devices fulfill their respective, particular objectives and requirements, the need remains for a lure that more realistically, and reliably, simulates the movement of an insect struggling on top of water.

SUMMARY OF THE INVENTION

The present invention meets the needs presented above by utilizing metal alloys that contract when subjected to an electrical current to move legs on the body of a lure. This movement mimics the motion of an insect struggling in water and does so without the need of mechanical gears and motors.

To this end, the present invention generally comprises a body having front end, a back end and a peripheral wall extending between the front and back ends. A loop is attached to the body and a hook is attached to the body. Each of a plurality of legs has first end and a second end. Each of a plurality of spindles is pivotally mounted in the peripheral wall. The spindles each have an outer end positioned outside of the body and an inner end positioned inside of the body. The outer ends are each attached to one of the first ends of the legs such that the spindles are orientated generally perpendicular to an attached one of the legs. Each of a plurality of wires is mounted in the body. The wires are each attached to one of the inner ends of the spindles. The wires comprise a shape memory alloy and contract in length generally between 1% and 10% when subjected to an electric current and return to an original length when the electric current is removed. The spindles are rotated in a first direction when the wires contract. A processor is electrically coupled attached to each of the wires and is adapted for sending pulses of electric current in a series to the wires.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
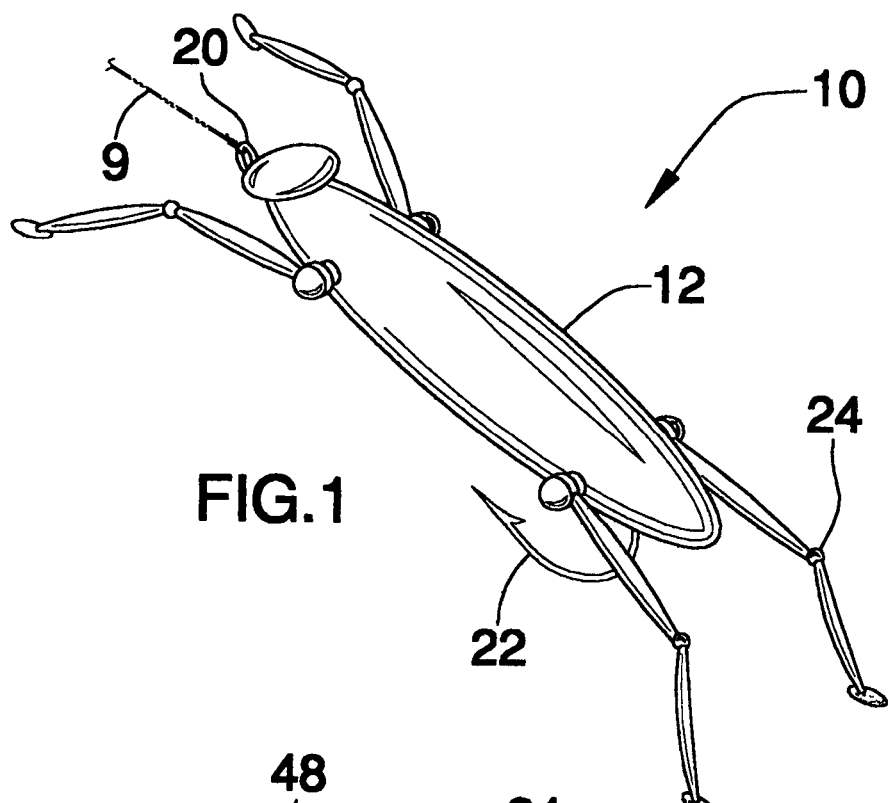
FIG. 1 is a schematic perspective view of a fishing lure according to the present invention.
Figure 2:
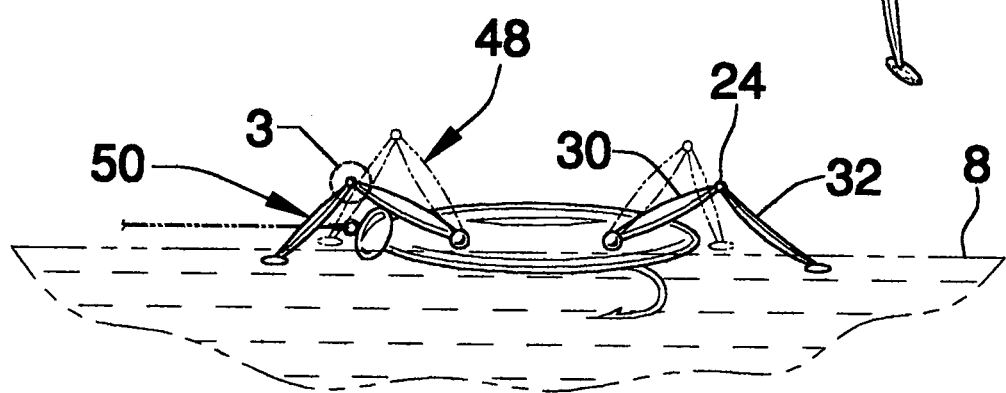
FIG. 2 is a schematic side view of the present invention.
Figure 3:
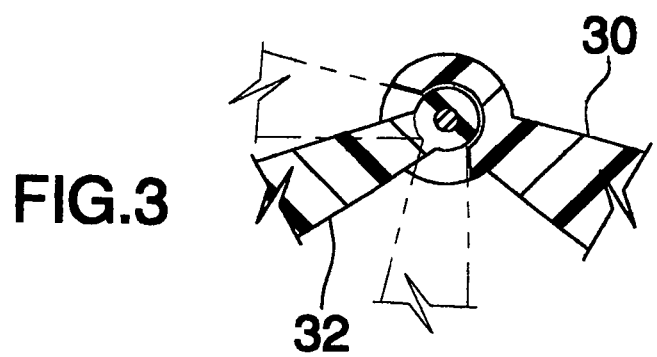
FIG. 3 is a schematic exploded cross-sectional view of designated area 3 of FIG. 2 of the present invention.
Figure 4:
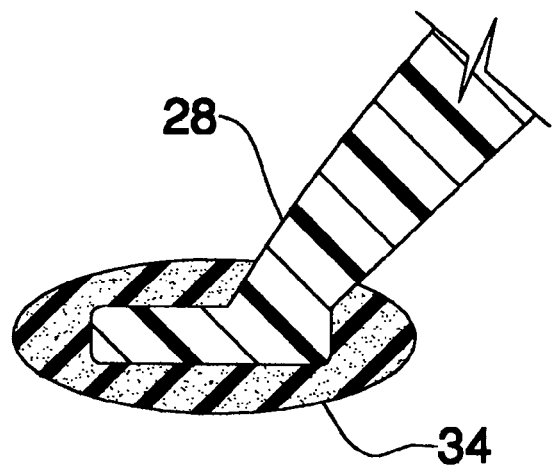
FIG. 4 is a schematic cross-sectional view of a float of the present invention.

With reference now to the drawings, and in particular to FIGS. 1 through 7 thereof, a new fishing lure device embodying the principles and concepts of the present invention and generally designated by the reference numeral 10 will be described.

As best illustrated in FIGS. 1 through 7, the fishing lure 10 generally comprises a body 12 having a front end 14, a back end 16 and a peripheral wall 18 extending between the front 14 and back 16 ends. The front end 14 preferably is bulbous and resembles an insect head. A loop 20 is attached to the body 12 and a hook 22 is attached to the body 12. The hook 22 preferably has a pointed end generally extending toward the loop 20. The body 12 may or may not comprise a water buoyant material, though it is preferred that the body is buoyant and resembles an insect, such as a grasshopper.

Each of a plurality of legs 24 has first end 26 and a second end 28. Each of the legs 24 has break therein such that a first portion 30 abutting the first end 26 and a second portion 32 abutting the second end 28 of each of the legs 24 is defined. The first portions 30 are hingedly coupled to a corresponding one of the second portions 32 such that the first 30 and second 32 portions may move between a first angle and a second angle formed by the first 30 and second 32 portions. Preferably, the first angle is generally between fifty degrees and 100 degrees and the second angle is generally between 120 degrees and 170 degrees. The ability to move from the first angle to the second angle allows the legs 24 to appear life-like. Preferably, each of a plurality of floats 34 is attached to one of the second ends 28 of the legs 24. The floats 34 insure that the legs 24 stay on top of the surface of water 8.

Each of a plurality of spindles 36 is pivotally mounted in the peripheral wall 18 such that a pair of front spindles and a pair of back spindles is defined. Preferably, each of the spindles 36 in the pairs of front and back spindles generally extends in opposite directions with respect to each other. The spindles 36 each have an outer end 38 positioned outside of the body 12 and an inner end 40 positioned inside of the body 12. The inner ends 40 are preferably positioned in cavities 42 positioned within the body 12. Each of the outer ends 38 is attached to one of the first ends 26 of the legs 24 such that the spindles 36 are orientated generally perpendicular to an attached one of the legs 24. Levers 44 are preferably attached to the inner ends 40 of the spindles 36.

Figure 5:
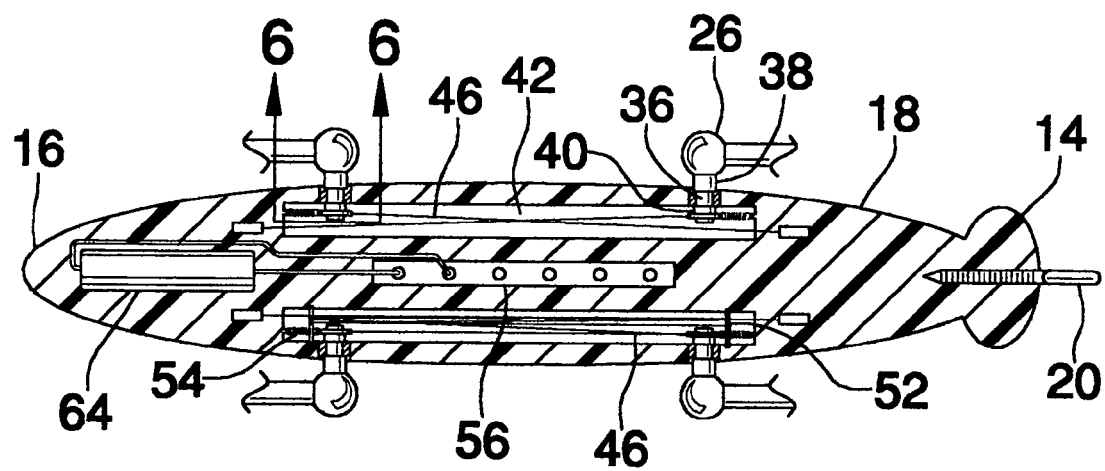
FIG. 5 is a schematic cross-sectional view of the present invention.
Figure 6:
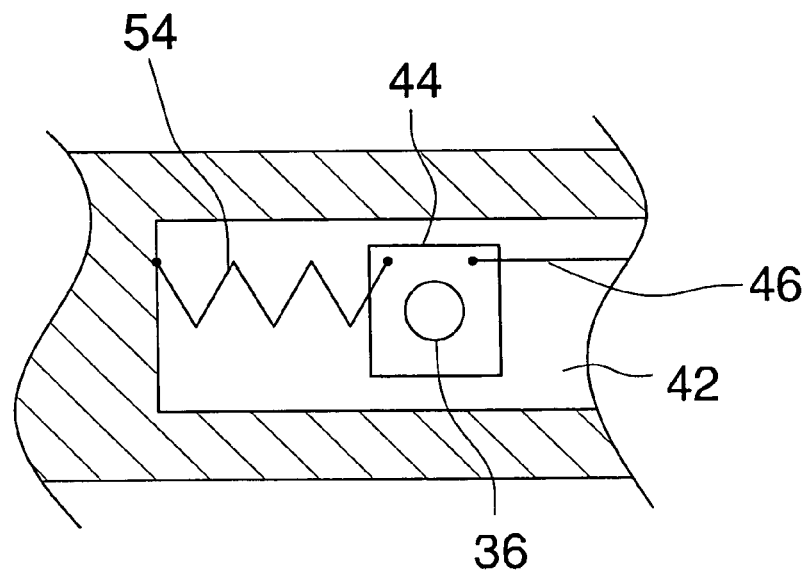
FIG. 6 is a schematic cross-sectional view taken along line 6—6 of FIG. 5 of the present invention.
Figure 7:
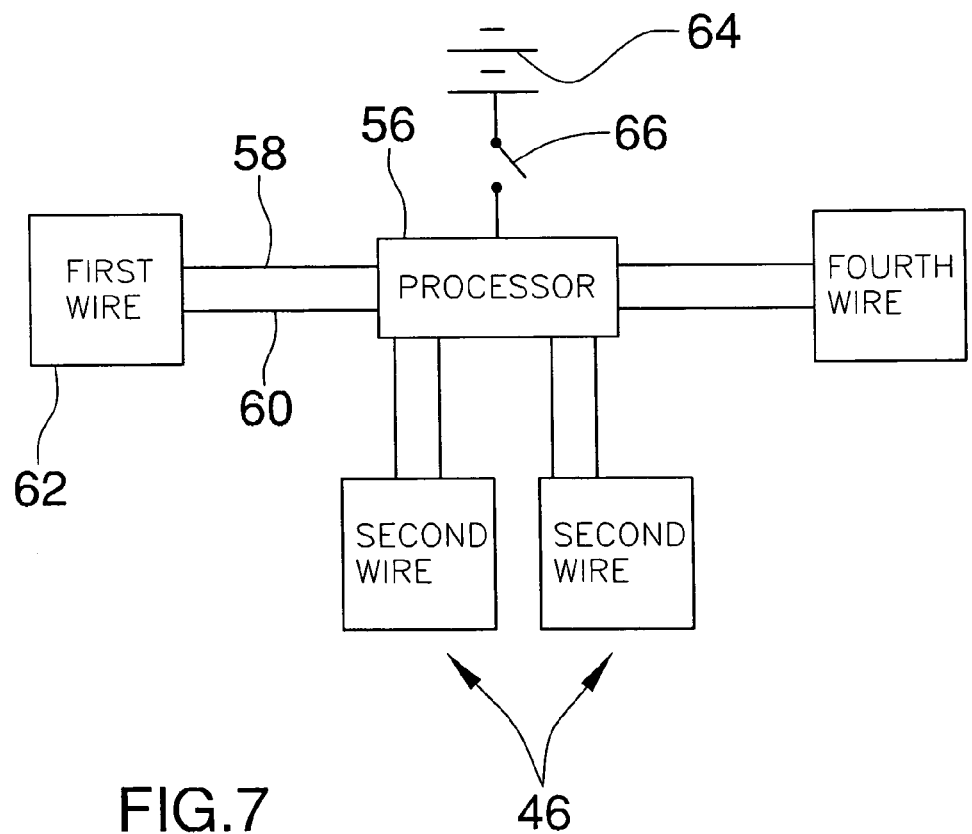
FIG. 7 is an electronic schematic view of the present invention.

Each of a plurality of wires 46 is mounted in the body 12 and located in one of the cavities 42. Each of the wires 46 is attached to one of the inner ends 40 of the spindles 36 with the levers 44. The wires 46 each comprise a shape memory alloy wherein each of the wires contract in length generally between 1% and 10%, and ideally between 6% and 8%, when subjected to an electric current and return to an original length when the electric current is removed. The preferred alloy is a nickel-titanium alloy known by the trade name of Nitinol, available from Shape Memory Applications, Inc., 1070. Commercial Street, Suite 110, San Jose, Calif. 95112. The spindles 7 are rotated in a first direction when the wires contract. Preferably, when the spindles 36 are rotated in the first direction, the legs 24 are lifted upwardly into a first position 48. When the electric current is removed, the leg 24 falls downward to the second position 50. FIG. 5 depicts two methods of mounting the wires 46 in the body. The first method includes a wire extending between a wall of the cavity 24 and the spindle 36. The second includes the wire being extended around a bar 52 and then attached to the spindle 36. The preferred embodiment includes the bar 52, though either configuration may be used.

Each of a plurality of biasing members 54 is preferably attached to one of the spindles 36 for biasing rotation of the spindles 36 in a second direction. The biasing members 54 pull the wires 46 so that the wires 46 quickly return to their original length. The enhanced ability to quickly stretch to the original length provides more realistic motion of the legs 24.

A processor 56 is electrically coupled attached to each of the wires 46 and is adapted for sending pulses of electric current in a series to the wires 46. The processor 56 preferably includes an output 58 and an input 60 for each of the wires 46. The output 58 sends an electric pulse to a first wire 62 and the input 60 receives the pulse after it has moved through the first wire 62. This input 60 causes the processor 56 to send a pulse to the next wire 46 after a predetermined amount of time has expired. Preferably, the time delay is between 0.01 seconds and 0.5 seconds. Additionally, it is preferred that that a minimum of 0.5 seconds elapses before the cycle begins at the first wire 62 again. Ideally, each of the pulses lasts less than 0.5 seconds. A power cell 64 is mounted within the body and operationally coupled to the processor 56. The power cell 64 preferably comprises a conventional 12 volt dry cell battery. An actuator 66 is preferably operationally coupled to the processor 56 for selectively turning the processor 56 on or off.

A processor capable of desired functions is an integrated circuit module commonly known by the part number BS1-1C, Such modules are manufactured by Parallax incorporated and are sold by that manufacturer under the part number BS1-1C. Parallax Incorporated is located at 599 Menlo Drive, Suite 100, Menlo Calif.

In use, the device is used as a conventional fishing lure. A fishing line 9 is attached to the loop 20. The lure 10 is cast into the water 8 and floats thereon. The processor 56 moves the legs 24 in a realistic motion to make the lure 10 appear as a struggling insect attempting to remove itself from the water 8. This movement attracts fish, particularly bass, which will bite the lure 10 and become caught on the hook 22.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing lure including:
    a body having a front end, a back end and a peripheral wall extending between said front and back ends, a loop being attached to said body, a hook being attached to said body;
    a plurality of legs, each of said legs having first end and a second end;
    a plurality of spindles, each of said spindles being pivotally mounted in said peripheral wall, each of said spindles having an outer end positioned outside of said body and an inner end positioned inside of said body, each of said outer ends being attached to one of said first ends of said legs such that said spindles are oriented generally perpendicular to an attached one of said legs;
    a plurality of wires being mounted in said body, each of said wires being attached to one of said inner ends of said spindles, each of said wires comprising a shape memory alloy wherein each of said wires contract in length generally between 1% and 10% when subjected to an electric current and return to an original length when said electric current is removed, said spindles being rotated in a first direction when said wires contract; and
    a processor being electrically coupled attached to each of said wires and adapted for sending pulses of electric current in a series to said wires.

2. The fishing lure of claim 1, wherein each of said legs has break therein such that a first portion abutting said first end and a second portion abutting said second end of each of said legs is defined, each of said first portions being hingedly coupled to a corresponding one of said second portions such that said first and second portions may move between a first angle and a second angle formed by said first and second portions.

3. The fishing lure of claim 2, wherein said first angle being generally between fifty degrees and 100 degrees and said second angle is generally between 120 degrees and 170 degrees.

4. The fishing lure of claim 1, wherein a pair of front spindles and a pair of back spindles are defined, each of said spindles in said pairs of front and back spindles generally extending in opposite directions with respect to each other.

5. The fishing lure of claim 1, further including a plurality of biasing members, each of said biasing members being attached to one of said spindles for biasing rotation of said spindles in a second direction.

6. The fishing lure of claim 1, wherein each of said pulses less than 0.5 seconds.

7. The fishing lure of claim 1, further including a plurality of water buoyant floats, each of said floats being attached to one of said second ends of said legs.

8. The fishing lure of claim 2, further including a plurality of water buoyant floats, each of said floats being attached to one of said second ends of said legs.

9. A fishing lure including:
    a body having a front end, a back end and a peripheral wall extending between said front and back ends, a loop being attached to said body, a hook being attached to said body, said hook having a pointed end generally extending toward said loop;
    a plurality of legs, each of said legs having first end and a second end, each of said legs having break therein such that a first portion abutting said first end and a second portion abutting said second end of each of said legs is defined, each of said first portions being hingedly coupled to a corresponding one of said second portions such that first and second portions may move between a first angle and a second angle formed by said first and second portions, said first angle being generally between fifty degrees and 100 degrees, said second angle being generally between 120 degrees and 170 degrees;

a plurality of spindles, each of said spindles being pivotally mounted in said peripheral wall such that a pair of front spindles and a pair of back spindles are defined, each of said spindles in said pairs of front and back spindles generally extending in opposite directions with respect to each other, each of said spindles having an outer end positioned outside of said body and an inner end positioned inside of said body, each of said outer ends being attached to one of said first ends of said legs such that said spindles are oriented generally perpendicular to an attached one of said legs;

a plurality of wires being mounted in said body, each of said wires being attached to one of said inner ends of said spindles, each of said wires comprising a shape memory alloy wherein each of said wires contract in length generally between 1% and 10% when subjected to an electric current and return to an original length when said electric current is removed, said spindles being rotated in a first direction when said wires contract;

a plurality of biasing members, each of said biasing members being attached to one of said spindles for biasing rotation of said spindles in a second direction;

a processor being electrically coupled attached to each of said wires and adapted for sending pulses of electric current in a series to said wires, each of said pulses lasting less than 0.5 seconds; and a plurality of water buoyant floats, each of said floats being attached to one of said second ends of said legs.

* * * * *